United States Patent [19]
Kohn

[11] Patent Number: 5,842,225
[45] Date of Patent: Nov. 24, 1998

[54] METHOD AND APPARATUS FOR IMPLEMENTING NON-FAULTING LOAD INSTRUCTION

[75] Inventor: Leslie Kohn, Fremont, Calif.

[73] Assignee: Sun Microsystems, Inc., Palo Alto, Calif.

[21] Appl. No.: 395,579

[22] Filed: Feb. 27, 1995

[51] Int. Cl.$^6$ .................................................. G06F 12/10
[52] U.S. Cl. .......................... 711/202; 711/145; 711/203; 711/206; 711/209; 711/165
[58] Field of Search .................................. 395/416–419, 395/410, 412, 1, 490, 376, 379, 145; 711/202, 203, 206, 209, 165

[56] References Cited

U.S. PATENT DOCUMENTS

| | | | |
|---|---|---|---|
| 4,410,941 | 10/1983 | Barrow et al. | 395/417 |
| 5,237,668 | 8/1993 | Blandy et al. | 395/490 |
| 5,479,628 | 12/1995 | Olson et al. | 395/416 |
| 5,530,839 | 6/1996 | Kamoto et al. | 395/490 |
| 5,623,636 | 4/1997 | Revilla et al. | 395/490 |

*Primary Examiner*—Eddie P. Chan
*Assistant Examiner*—Than V. Nguyen
*Attorney, Agent, or Firm*—Limbach & Limbach L.L.P.

[57] ABSTRACT

A non-fault-only (NFO) bit is included in the translation table entry for each page. If the NFO bit is set, non-faulting loads accessing the page will cause translations to occur. Any other access to the non-fault-only page is an error, and will cause the processor to fault. A non-faulting load behaves like a normal load except that it never produces a fault even when applied to a page with the NFO bit set. The NFO bit in a translation table entry marks a page that is mapped for safe access by non-faulting loads, but can still cause a fault by other, normal accesses. The NFO bit indicates which pages are illegal. Selected pages, such as the virtual page 0x0, can be mapped in the translation table. Whenever a null-pointer is dereferenced by a non-faulting load, a translation lookaside buffer (TLB) hit will occur, and zero will be returned immediately without trapping to software to find the requested page. A second embodiment provides that when the operating system software routine invoked by a TLB miss discovers that a non-faulting load has attempted to access an illegal virtual page that was not previously translated in the translation table, the operating system creates a translation table entry for that virtual page mapping it to a physical page of all zeros and asserting the NFO bit for that virtual page.

22 Claims, 5 Drawing Sheets

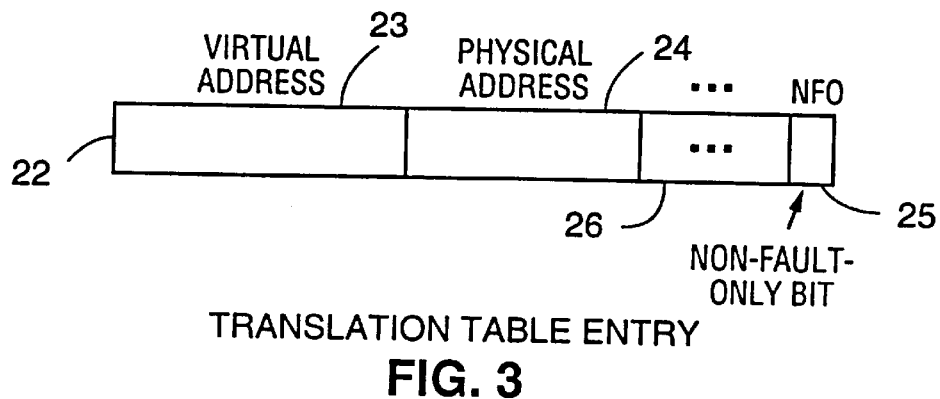
FIG. 3
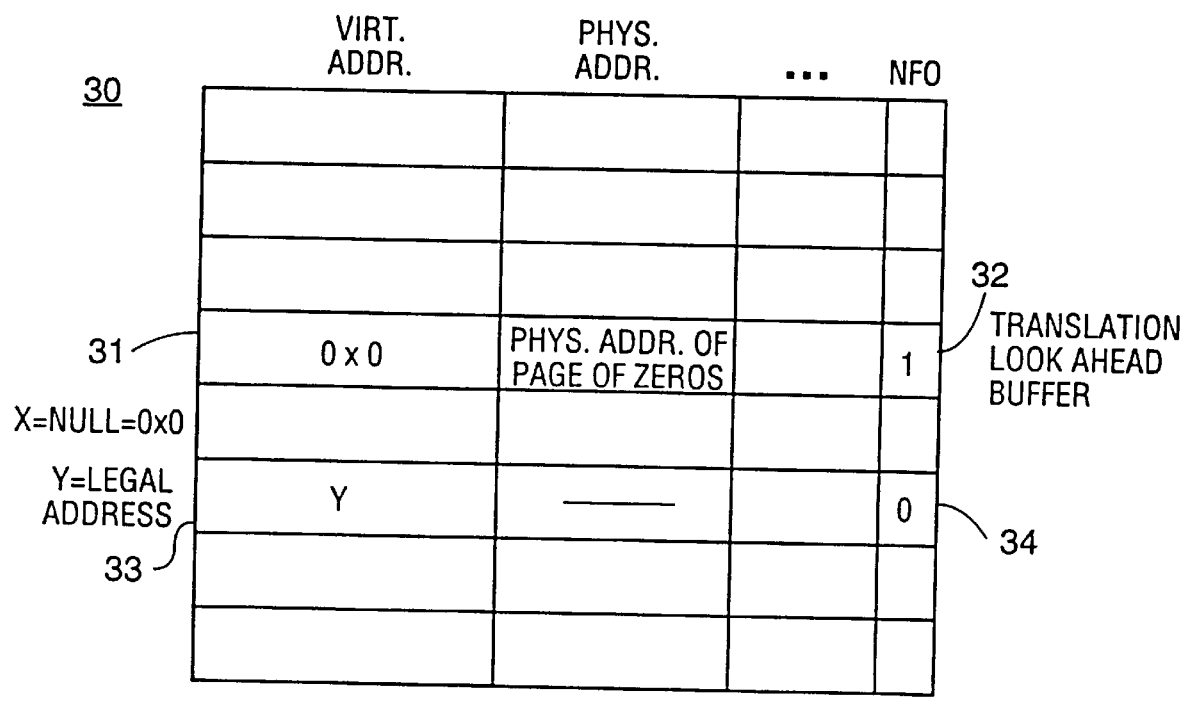
FIG. 4
| INSTRUCTION | RESULT |
|---|---|
| LOAD X | FAULT |
| NF_ LOAD X | RETURN ZERO |
| LOAD Y | RETURN DATA |
| NF_ LOAD Y | RETURN DATA |
FIG. 5

METHOD AND APPARATUS FOR IMPLEMENTING NON-FAULTING LOAD INSTRUCTION

BACKGROUND OF THE INVENTION

1. Field of the Invention

The present invention relates to pipelined processors which speculatively execute instructions, and, specifically, to support for non-faulting and normal (faulting) load instructions.

2. Discussion of the Prior Art

A typical early microprocessor included a central processing unit (CPU) which implemented a machine capable of interfacing with memory and serially executing a sequence of instructions. FIG. 1 is a simplified block diagram of a modern processor. The instruction execution was typically broken into at least four major stages: instruction and operand fetch 1, instruction decode 2, execution 3, and write back 4 of results. The maximum clock frequency was determined by the longest possible propagation delay through all four stages.

The concept of pipelining increased the maximum clock frequency by reducing the amount of logic performed in each clock cycle. The pipelining concept can be extended such that each of the four stages is performed in a separate clock cycle, thus increasing the throughput accordingly. Superpipelined designs break up the logic in some or all of the four stages so as to reduce the maximum propagation delay through any one stage, and thus increase the operating frequency and throughput as the instruction execution is broken into more than four pipeline stages. Theoretically, by breaking up the processor logic into N stages having equal latency, the throughput may be increased by a factor of N.

A superscalar microprocessor has more than one execution unit. Superscalar processor designs executing two or three instructions at a time are becoming commonplace. Designs which execute four instructions currently exist, and it is expected that computer architects will design chips that can execute eight to sixteen instructions simultaneously in the future. Most superscalar implementations provide specialized parallel execution branches; meaning that each parallel execution branch is not capable of supporting the entire instruction set. Instead, each branch is designed to handle a subset of the instruction set.

A fundamental difficulty involved in both pipelined and superscalar processors involves the handling of conditional branches in the execution sequence. Most programs include frequent conditional branches. When executing such a program in a pipeline, there is no way to tell with certainty which branch will eventually be executed. Before the execution of the branch instruction, there is no way to tell with certainty which instruction should follow directly after the branch instruction because the results upon which the branch decision is made are not available until that instruction has been executed. Because the fetch stage 1 has fetched the next instruction following the branch instruction into the pipeline already, the series of instructions following the branch may have to be aborted. This problem is worsened when the number of stages preceding the branch execution stage is increased. Thus, as pipelines become longer to speed up the processors, the branching problem becomes more complicated.

A similar problem occurs in superscalar processors, whether pipelined or not. Since a superscalar processor can execute more than one instruction at any given time, one execution unit might be executing a conditional branch instruction, while another execution unit is executing an instruction which should only be executed if the conditional branch condition is satisfied. If it turns out that the condition was not satisfied, so that the instruction in the other execution unit should not be executed, the architecture must provide a way that the execution of the contingent instruction can be aborted or reversed. If that contingent instruction results in the writing to a register or memory location destroying the contents of that register or memory location, the system must be able to restore the previous contents. Alternatively, compilers designed for superscalar processors could be designed using intermediate storage locations so as never to write over potentially important registers or memory locations until all the contingencies have been resolved.

Even if the compilers are written so as never to destroy memory contents until the contingencies are determined, another problem exists. For example, consider the C program fragment:

if (p !=NULL) x=*p+y;

This fragment can be conceptually broken up into at least two parts. In the C programming language, *p indicates that p is a pointer and *p represents the contents of the location pointed to by p. The first part is the conditional test as to whether the memory location storing the variable p does not contain the code represented by the NULL symbol. If the condition is true, the second part is to assign, to the memory location holding the variable x, the sum of the variable y and the quantity stored in the memory location whose address is contained in the memory location p. As described above, the compiler will sequence the instructions so as not write over and thus destroy the current value of variable x until the conditional outcome is determined, thus preserving the current value of x so that if the condition is false, no restoration needs to be performed. Therefore, a compiler might break the above fragment into the following sequence.

temp_register=*p;

if (p !=NULL) x=temp_register+y;

The above instructions might be scheduled so that the assignment to the temp_register and the test as to p being not NULL are performed simultaneously by separate execution units. The problem that can still occur with the above sequence is that if p is NULL, an attempt to read the contents of the location pointed to by p is non-sensical, since p does not point to anything. A normal access to the contents of p on many processors would cause the program to be aborted.

To solve this problem, the concept of no-fault loading has been introduced. In this case, if p is NULL, and an instruction tries to load *p, instead of causing a fault or error, the load returns some predetermined value such as zero. The value that is returned by a non-faulting load from an illegal address is not important, since in all likelihood it will never be used. The data returned from a non-faulting load on an illegal address will most likely not ever be used because the mispredicted branch that caused the load will be resolved before any use. Even if a use were made of the returned data, the result of that subsequent execution would also be aborted. Therefore, the value returned by a non-faulting load on an illegal address should be chosen so as not to cause exceptions if subsequently used.

Non-faulting loads allow optimizations that move loads ahead of conditional control structures which guard their use; thus, they can minimize the effects of load latency by improving instruction scheduling. The semantics of non-faulting load are the same as for any other load, except when non-recoverable catastrophic faults occur (for example, address-out-of-range errors). When such a fault occurs, it is ignored and the hardware and system software cooperate to make the load appear to complete normally, returning a zero result. The compiler's optimizer generates load-alternate instructions for those loads it determines should be non-faulting. It also allows for improved performance in certain algorithms by removing address checking from the critical code path. "Dereferencing" a pointer is attempting to access the contents of the location pointed to by the pointer. When following a linked list, non-faulting loads allow the null pointer indicating the end of the list to be dereferenced safely in a speculative, read-ahead fashion; the page at virtual address 0x0 can safely be accessed with no penalty.

Modern processors support virtual address space, which is distinct from physical address space. A virtual address is a label that the processor uses to specify a memory location. The processor is not concerned with where that memory location actually resides in the physical memory, so long as the processor is able to access the location with the virtual address. A processor architecture specification defines a certain virtual address space which must be supported. The operating system which manages the computer system has flexibility as to how that virtual address space is mapped to physical memory. Thus, there is a translation that must occur from virtual to physical address.

The operating system maintains translation information in an arbitrary data structure, called the "software translation table." One or more translation lookaside buffers (TLBs) act as independent caches of the software translation table, providing one-cycle translation for the more frequently accessed virtual pages. The term "TLB hit" means that the desired translation is present in the on-chip TLB. The term "TLB miss" means that the desired translation is not present in the on-chip TLB. The TLBS are small and fast. The software translation table is likely to be large and complex. A translation storage buffer (TSB), which acts like a direct-mapped cache, is the interface between the TLBs and the software translation table.

Whenever a TLB miss occurs, the processor immediately traps to operating system software for TLB miss processing. The TLB miss handler has the option of filling the TLB by any means available. After the TLB has been filled with the translation for the address desired, the instruction which initially caused the TLB miss is re-executed.

The typical TLB miss software will first load certain pointers necessary to access the TSB. Using those pointers, the handler will check the appropriate location of the TSB to see if the desired translation exists there. If the desired translation is in the TSB, the translation is loaded into the TLB entry chosen by the replacement algorithm. If the translation does not exist in the TSB, the TLB miss handler jumps to the more sophisticated, and slower, TSB miss handler. The TSB miss handler searches the large and complex software translation table for the desired translation. If the translation is not located in the software translation table, the desired memory location is not mapped in main memory. In this case, the address may be illegal. Alternatively, the data referred to by the specified virtual address is legal but is on some other memory device, such as a disk. If the address is legal, but is not in main memory, then the requested data must be mapped into main memory, and its translation entered into the TLB before the instruction which caused the TLB miss can execute.

When a non-faulting load encounters a TLB miss, the operating system should attempt to translate the page. If the translation results in an error (e.g. address out of range), a 0 is returned and the load completes silently. According to some prior art schemes, in the case of a non-faulting load instruction in which the desired address is illegal, there will not be a mapping to the illegal page. Thus, a TLB miss will occur. The software trap will result in a TSB miss, and the determination that the address is illegal will take a relatively long time, thus preventing the processor from performing other useful work. If the processor only allows legal pages to be mapped, a non-faulting load from an illegal address will always cause a trap which takes a long time to return. Thus, each dereference of a null pointer causes a lengthy software trap before finally returning zero.

FIG. 2 is a flowchart illustrating the prior art methods of processing load instructions. All the steps shown enclosed by the dotted line 9 are typically implemented in hardware. The load instruction is first dispatched in step 10. At test 11, a compare operation is simultaneously performed by associative hardware to all the translation table entries. The TLB is searched for the virtual page number that the current load is requesting. If there is a TLB hit, the TLB supplies the appropriate physical page at step 12, the load instruction executes at step 13, and the load instruction is finished at step 14.

If the virtual address is not in the TLB, the TLB miss handler is invoked at step 15. The software looks in the translation table for the translation at test 16. If the translation exists, the software fills the TLB with the appropriate translation, and the load is executed. If the translation does not exist at any level of the translation table data structure, the software determines in test 18 whether the address is legal. If the address is legal, a recoverable page fault occurs at step 19. When a page fault occurs, the requested page may be on disk or another external memory device, and must be mapped and transferred into main memory in order to recover from the page fault. If the address is illegal, test 20 determines if the current instruction is a non-faulting load. If the current instruction is a normal (faulting) load, the illegal address causes a non-recoverable fault 19. However, if the current instruction is a non-faulting load, the software returns zero at step 21, and the load instruction finishes 14 smoothly.

One way to speed up the process of returning zero is to provide a mapping for address zero to a page of all zeros. By using this scheme, the design departs from the standard concept that all mappings in the software translation tables are to legal pages. If this approach is taken, the illegal page has a translation which can exist in the TLB. Whenever a deference to a null pointer is performed, a TLB hit will result since the translation is in the TLB, and zero will be returned immediately without any trap to software. Essentially, this approach merely transforms certain frequently accessed illegal addresses into legal addresses.

Other illegal addresses which are not commonly accessed by non-faulting loads may be chosen not to be mapped so as to cause faults when accessed by normal loads. They will still result in TLB misses, the software trap, and a result of zero. Only the pages most commonly accessed by non-faulting loads (such as 0x0) should be mapped since this minimizes the risk that a normal load will behave incorrectly while gaining most of the benefit of shorter latency from non-faulting loads.

In a processor which supports non-faulting load instructions, normal faulting loads must also be supported. However, if a page of all zeros is mapped, then in the absence of any other mechanism, normal loads will also be able to access the page. Technically, this is incorrect behavior. The problem with this approach is that normal loads will also be able to access the illegal page. Normal (faulting)

loads should cause a fault when they attempt to access an illegal page, rather than returning zero. Using this scheme, the programmer must choose on a page by page basis between quick returning from non-faulting loads from the illegal page, or having normal (faulting) loads behave correctly by faulting rather than returning zero when accessing the illegal page.

Many programmers count on an exception being generated when accessing address 0x0 to debug code. Virtual address 0x0 is "null" and is usually an illegal address. A very common bug in typical programs is attempting to dereference a null pointer. During the debugging phase of software development, a programmer will use normal (faulting) loads in his code specifically for the purpose of causing faults whenever a null pointer is dereferenced. After the fault has occurred, the programmer can inspect the state of the machine to determine what has gone wrong.

When the program is completely debugged, the programmer will tell the compiler that it may use non-faulting loads in the machine code that it produces in order to speed up execution by moving loads beyond their conditional branches. The use of non-faulting loads will prevent catastrophic non-recoverable faults from occurring in the debugged program. However, unless a page is mapped to memory location 0x0, the non-faulting loads will nonetheless cause a software trap to occur when accessing address 0x0 (or any other illegal address). These repeated traps can consume an inordinate amount of time. To minimize unnecessary processing if a fault does occur, it is desirable to map low addresses (especially address zero) to a page of all zeros, so that references through a null pointer do not cause unnecessary traps. Thus, the software traps can be avoided by mapping a page of zeros to memory location 0x0.

Most modern program development occurs in stages. Certain routines or procedures are debugged before other related software is completed and debugged. In many situations it is necessary to compile a debugged procedure with a program still containing bugs. If a page of all zeros is mapped to memory location 0x0, the program or procedures still under development will lose the advantage of producing faults when a null pointer is dereferenced, since zero will be returned instead of faulting. This is incorrect behavior, since address 0x0 is illegal and should not return zero for a normal load. Unless some other mechanism exists, all loads whether faulting or non-faulting will return zero when a null pointer is dereferenced if a page of all zeros is mapped to memory location 0x0.

SUMMARY OF THE INVENTION

According to a first embodiment of the present invention, a non-fault-only bit is included in the translation table entry for each page. If the non-fault-only bit is set, non-faulting loads accessing the page will cause translations to occur. Any other access to the non-fault-only page is an error, and will cause the processor to fault through an operating system software trap. A non-faulting load behaves like a normal load except that it never produces a fault even when applied to a page with the non-fault-only bit set. The non-fault-only bit in a translation table entry marks a page that is mapped for safe access by non-faulting loads, but can still cause a fault by other, normal accesses.

This allows programmers to trap on wild pointer references during the debugging phase while still benefitting from the acceleration of non-faulting access in debugged library routines that are used by the software being debugged. Strictly correct program execution is guaranteed since normal (faulting) loads will in fact fault if they attempt to access the illegal page marked with an asserted non-fault-only bit.

The non-fault-only bit indicates which pages are illegal. Upon a translation lookaside buffer hit, since every possible outcome has hardware support, all normal and non-faulting loads are processed quickly in hardware and are executed strictly correctly. Selected pages, such as the virtual page 0x0, can be mapped in the translation table. If accessed once, the translation table entry for virtual page 0x0 will be present in the translation lookaside buffer. Thus, whenever a null-pointer is dereferenced by a non-faulting load, a TLB hit will occur and zero will be returned immediately without trapping to software to find the requested page.

According to a second embodiment of the present invention, when the operating system software routine invoked by the TLB miss discovers that a non-faulting load has attempted to access an illegal virtual page that was not previously translated in the translation table, the operating system creates a translation table entry for that virtual page mapping it to a physical page of all zeros and asserting the non-fault-only bit for that virtual page. Any subsequent non-faulting load from that virtual page will either hit the TLB and avert the TLB miss handler, or at least avoid an expensive, exhaustive, and unsuccessful software search through the software translation table for the illegal virtual page's translation table entry.

BRIEF DESCRIPTION OF THE DRAWINGS

FIG. 3 depicts a translation table entry according to the present invention.

FIG. 4 depicts a translation lookahead buffer according to the present invention.

FIG. 5 shows four load instructions and the results that are produced by those four instructions when the translation lookahead buffer has entries as shown in FIG. 4.

DETAILED DESCRIPTION OF THE INVENTION

Figure 1:
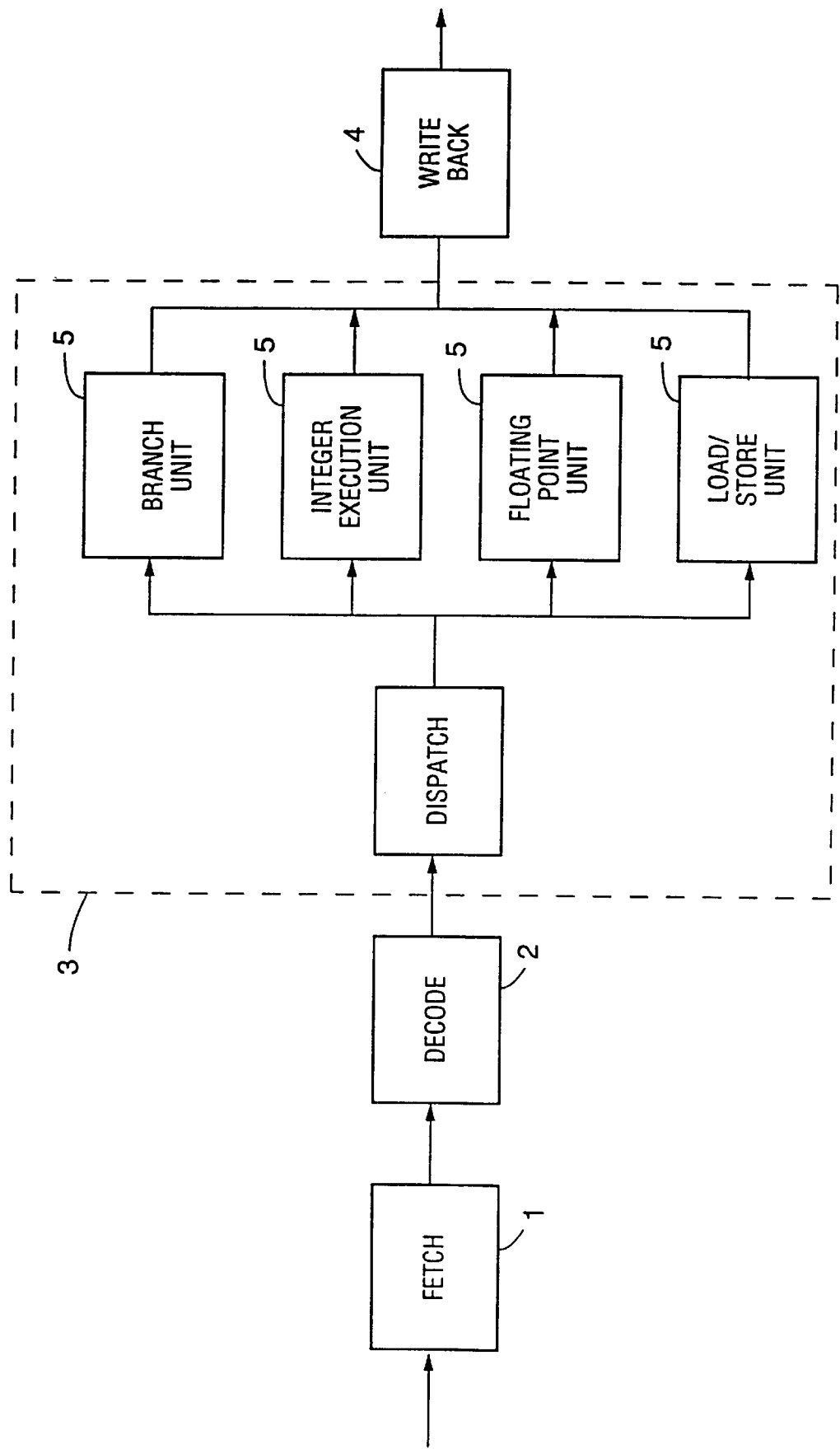
FIG. 1 is a simplified block diagram of a modern pipelined, superscalar processor according to the prior art.
Figure 2:
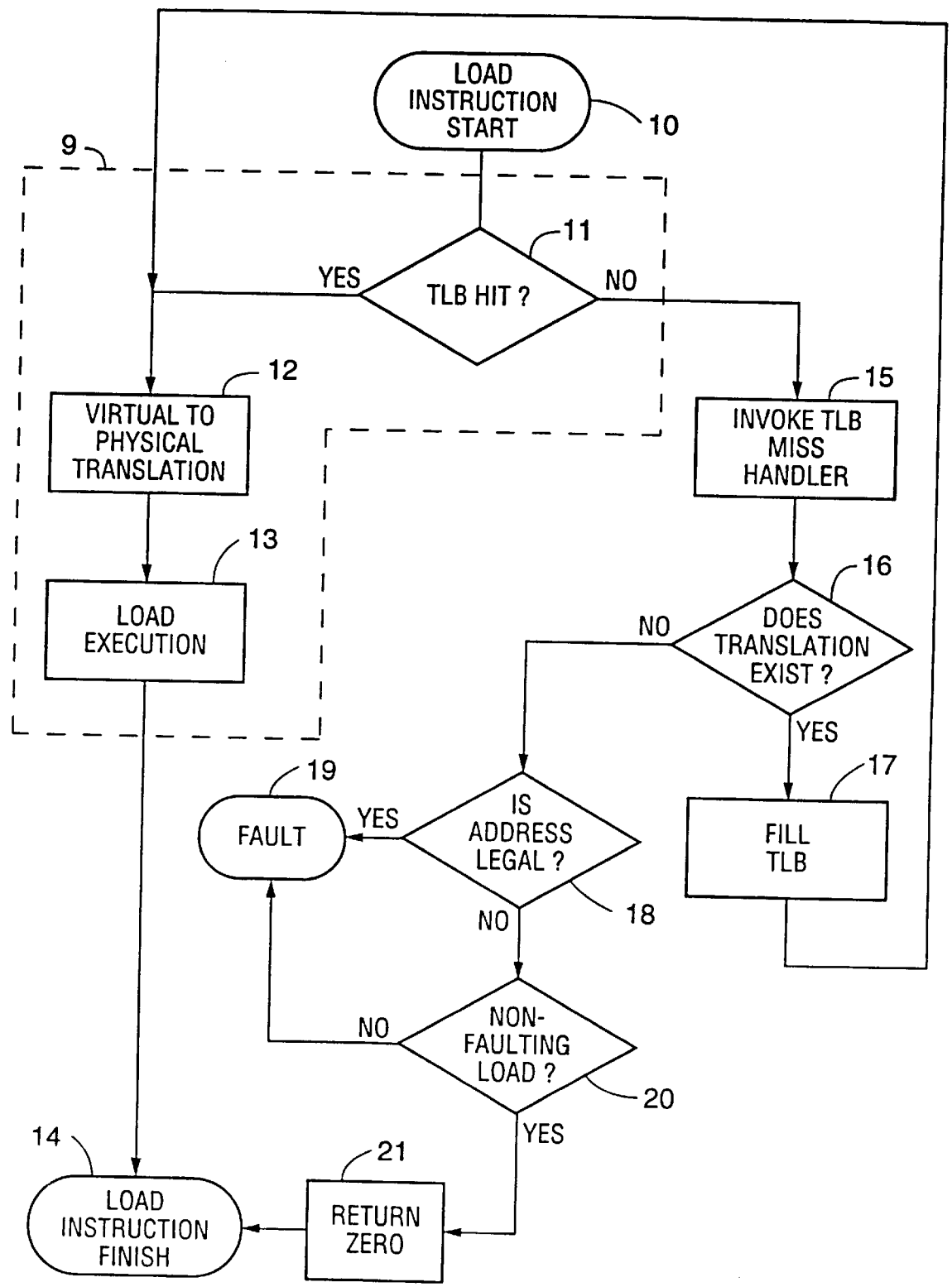
FIG. 2 is a flowchart illustrating prior art methods of processing load instructions.

According to the present invention, a non-fault-only bit is included in the translation table entry for each page. If the non-fault-only bit is set, non-faulting loads accessing the page will cause translations to occur. Any other access to the non-fault-only page is an error, and will cause the processor to fault through an operating system software trap. A non-faulting load behaves like a normal load except that it never produces a fault even when applied to a page with the non-fault-only bit set.

FIG. 3 shows a translation table entry 22 according to the present invention. Each entry has a virtual address portion 23. Entries in the translation table are organized according to the virtual addresses for which they hold physical address mappings. Since memory is typically separated into pages, only the most significant bits of the virtual address and the corresponding physical address 24 are stored in the translation table entry. The omitted least significant bits of both the virtual address and the physical address provide an index or offset within the memory page. The non-fault-only bit 25 exists for each entry. Additional information 26 may also exist in the translation table entry.

Normal accesses or loads to a page with an asserted non-fault-only bit will cause an error handling software trap resulting in a fault. Thus, the non-fault-only bit in the translation table entry marks a page that is mapped for safe access by non-faulting loads, but can still cause a fault by other, normal accesses. This allows programmers to trap on wild pointer references during the debugging phase while still benefitting from the acceleration of non-faulting access in debugged library routines that are used by the software being debugged. Moreover, strictly correct program execution is guaranteed since normal (faulting) loads will in fact fault if they attempt to access the illegal page marked with an asserted non-fault-only bit.

The non-fault-only bit indicates which pages are illegal. Thus, if a physical page (at physical address 0xF, for example) of all zeros is mapped to virtual memory location 0x0, the non-fault-only bit in the translation table entry for virtual page 0x0 is asserted. If a non-faulting load dereferences a null pointer, the virtual address 0x0 will be translated to the appropriate physical page (0xF), and the contents of location referred to on that page, zero, will be returned. However, if a normal, faulting load dereferences a null pointer, the virtual address 0x0 will not be translated because the page 0x0 is marked as illegal by the asserted non-fault-only bit which exists in the translation table entry for virtual address 0x0. This normal (faulting) load access of an illegal page causes a trap resulting in a fault. Therefore, the programmer will gain the benefit of hardware support for quick return of zero for non-faulting loads without affecting the strictly correct behavior of normal (faulting) loads.

FIG. 4 illustrates a small translation lookaside buffer 30 with an entry 31 mapping a null pointer to a page of all zeros; the non-fault-only bit 32 for that entry 31 is asserted. FIG. 4 also shows an entry 33 for a legal virtual address which has a deasserted non-fault-only bit 34. FIG. 5 illustrates the results corresponding to a normal (faulting) load, shown as "LOAD," and a non-faulting load, shown as "NF_LOAD," when each type of load is applied to a legal address, shown as "Y," and a dereferencing of a null pointer, shown as "X."

As shown by the TLB entry 31 for the null pointer, hardware support is provided to quickly return zero for non-faulting loads which access illegal addresses. The non-fault-only bit essentially indicates whether or not the virtual page is legal. If the non-fault-only bit is asserted, the virtual page is illegal. If a normal load attempts to access a virtual page with an asserted non-fault-only bit, the processor will trap to the software and fault.

Figure 6:
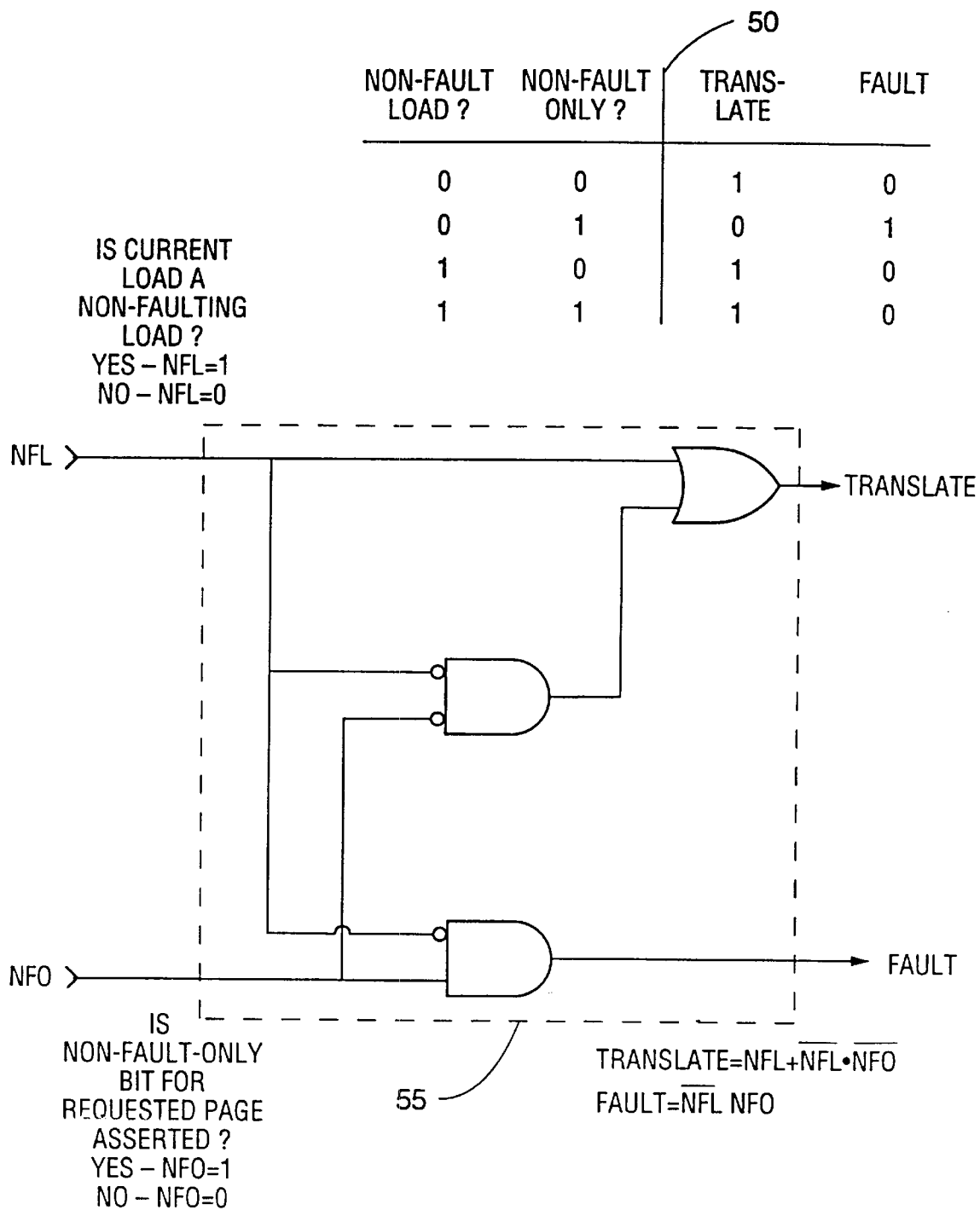
FIG. 6 illustrates logic that implements control signals for directing the processing when a translation table entry exists for the accessed page according to the present invention.

FIG. 6 shows the truth table for the logic applied to determine whether to execute or fault when a translation table entry exists for the accessed page according to the present invention. FIG. 6 also shows a simple logic circuit 55 which performs the logic.

Figure 7:
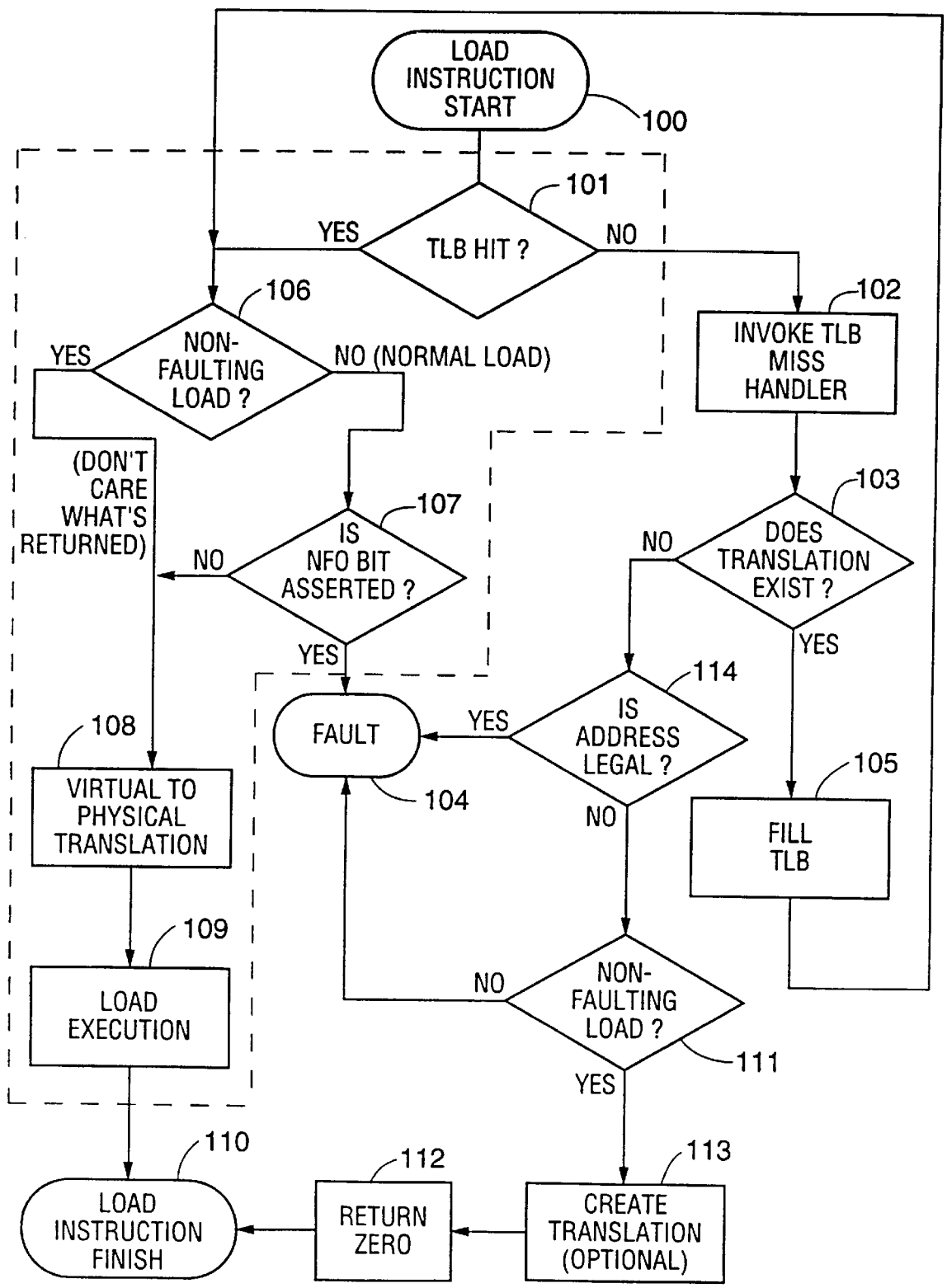
FIG. 7 is a flowchart illustrating the methods of processing load instructions according to the first and second embodiments of the present invention. Step 113 is not included in the first embodiment, but is included in the second embodiment.

FIG. 7 illustrates the sequence of events when a load instruction is executed in a processor according to the present invention. The load instruction processing begins at step 100 with regard to the present invention. Test step 101 checks to see if the translation table entry which contains the non-fault-only (NFO) bit of the virtual to physical page translation for the memory location to be loaded exists in the translation lookaside buffer (TLB). If the entry is not in the translation lookaside buffer, the processor traps to a TLB miss handler 102, which is an operating system software routine. The TLB miss handler searches the necessary additional levels of the software translation table to locate the translation table entry for the virtual page requested by the load instruction. If no translation is located anywhere in the software translation table, test 103 invokes test 114 which determines whether or not the address is truly illegal. If the address is legal, but merely is not mapped, a recoverable fault 104 occurs. For example, this would occur if the memory location were on disk rather than in main memory, so that a page fault should occur. If a page fault occurs, the appropriate page is read in from the disk and is mapped to physical memory, and a translation table entry for that virtual address is created and put in the translation lookaside buffer. After the load instruction is reexecuted, the processor has recovered from the fault. If the requested virtual address is truly illegal, test 111 determines whether or not current load is a non-faulting load. If the current load is a non-faulting load, the software will return zero 112, and execution will continue without faulting. If the software returns zero, the load instruction is finished 110. If test 111 determines that the current load is a normal (faulting) load, the illegal address causes a non-recoverable fault 104.

As can be deduced from the discussion above, the fault bubble 104 represents a trap to a software routine. Some faults are recoverable, such as page faults. Other faults are non-recoverable, such as a normal load access to an illegal address.

If the translation table entry for the requested page is found in the software table, test 103 invokes the filling of the translation lookaside buffer with the requested table entry in step 105. Once the translation table entry is retrieved, test 106 checks the current machine state to see if the load is a non-faulting load. If the current load is a normal (faulting) load, test 107 checks to see if the non-fault-only (NFO) bit of the page being requested by the load is asserted. If the non-fault-only bit of the requested page is not asserted, the requested page is a normal page and is safe for access by both non-faulting and normal loads. However, if the non-fault-only bit of the requested page is asserted, the requested page is an illegal page, and access by a normal (faulting) load will produce a non-recoverable fault 104. In step 108, the virtual to physical address translation occurs. The load is then executed in step 109 and the load instruction finish 110 is reached. Once the finish 110 is reached, the load instruction start 100 may begin for the next load instruction.

Everything enclosed in dotted lines in FIG. 7 is preferably implemented in hardware. If the current instruction is a non-faulting load and a translation table entry was found for the requested page, test 106 causes a translation 108 and load execution 109 to occur. If there is a TLB hit in step 101, the advantages of the present invention are realized. Upon a translation lookaside buffer hit, every possible outcome has hardware support. All normal and non-faulting loads are processed quickly in hardware and are executed strictly correctly. Selected pages, such as the virtual page 0x0, can be mapped in the translation table. If accessed once, the translation table entry for virtual page 0x0 will be present in the translation lookaside buffer. Thus, whenever a null-pointer is dereferenced by a non-faulting load, a TLB hit will occur, and zero will be returned immediately without trapping to software to find the requested page.

Because only the pages likely to be accessed by non-faulting loads, such as virtual page 0x0, will be mapped in the translation table, other illegal pages will still be absent from the translation table. In that case, the operating system software trap initiated by the TLB miss will eventually discover that no translation table entry exists for the requested virtual page, and will return zero.

According to a second embodiment of the present invention, when the operating system software routine invoked by the TLB miss discovers that a non-faulting load has attempted to access an illegal virtual page that was not previously translated in the translation table, the operating system (in step 113 of FIG. 7) creates a translation table entry for that virtual page mapping it to a physical page of all zeros and asserting the non-fault-only bit for that virtual page, so that any subsequent non-faulting load from that virtual page will either hit the TLB and avert the TLB miss handler, or at least avoid an expensive, exhaustive, and unsuccessful software search through the software translation table for the illegal virtual page's translation table entry.

This second embodiment eliminates the need for the programmer or the compiler to anticipate before execution which illegal virtual addresses will be accessed by non-faulting loads. Whenever an illegal page is referenced by a non-faulting load, the operating system creates the appropriate translation table entry. Subsequent non-faulting loads from that page may hit the translation lookaside buffer and thus avoid the software trap.

The invention has been described as a way of processing load instructions of at least two varieties, non-faulting loads and normal (faulting) loads. Typically, in a modern RISC (Reduced Instruction Set Computing) processor, load instructions are the only instructions which retrieve data from main memory. However, this is not meant to imply that the present invention does not apply to other instructions which reference main memory that may exist for a given processor. For example, a given processor might support an "add" instruction which allows one or more of its operands to come from main memory rather than from internal registers. In that case, the retrieval of an operand from main memory for the add instruction is equivalent to a load instruction as described in this specification. Thus, a CISC (Complex Instruction Set Computing) processor could have non-faulting add instructions as well as normal (faulting) add instructions. Essentially, the present invention applies to any instruction which causes the retrieval of data from main memory. In the case of a simple RISC processor, this might only be load instructions, but generally includes all instructions which retrieve data from main memory.

While the method and apparatus of the present invention has been described in terms of its presently preferred embodiments, those skilled in the art will recognize that the present invention may be practiced with modification and alteration within the spirit and scope of the appended claims. Therefore, the specifications and drawings are to be regarded in an illustrative rather than a restrictive sense.

What is claimed is:

1. A translation table entry within a memory, for use by a processor, the translation table entry comprising:
   a virtual address portion that specifies a virtual address space to which the translation table entry applies;
   a physical address portion that specifies a physical address space to which the virtual address space corresponds; and
   a non-fault-only bit, wherein the non-fault-only bit indicates whether or not a non-fault instruction or a normal fault load instruction has access to the virtual address space.

2. A translation table entry as in claim 1, wherein the virtual address portion is a virtual page number.

3. A translation table entry as in claim 1, wherein the physical address portion is a physical page number.

4. A translation table having a plurality of translation table entries as in claim 1.

5. A translation table as in claim 4, wherein translation table entries with deasserted non-fault-only bits correspond to legal virtual addresses.

6. A translation table as in claim 5, wherein translation table entries with deasserted non-fault-only bits correspond to virtual addresses which are accessible by both normal memory accesses and non-faulting memory accesses.

7. A method of processing a load instruction wherein a translation table entry exists for a virtual source page address, comprising the steps of:
   determining whether the load instruction is a non-faulting load instruction or a normal faulting load instruction;
   in response to a determination that the load instruction is a normal faulting load instruction
      testing whether a non-fault-only bit in the translation table entry is asserted;
      translating the virtual source page address into a physical source page address if the testing step determines that the non-fault-only bit is not asserted; and
      faulting if the testing step determines that the non-fault-only bit is asserted.

8. A method as in claim 7, further comprising the step of:
   executing the load instruction after the translating step if the testing step determines that the non-fault-only bit is not asserted.

9. A method as in claim 8, wherein the faulting step is accomplished by trapping to an operating system software routine.

10. A method of processing a load instruction wherein a translation table entry exists for a virtual source page address, comprising the steps of:
    testing whether the load instruction is a non-faulting load instruction;
    translating the virtual source page address into a physical source page address if the load instruction is a non-faulting load instruction;
    testing whether a non-fault-only bit in the translation table entry is asserted if the load instruction is not a non-faulting load instruction;
    translating the virtual source page address into a physical source page address if the non-fault-only bit is not asserted and if the load instruction is not a non-faulting load instruction; and
    faulting if the non-fault-only bit is asserted and if the load instruction is not a non-faulting load instruction.

11. A method as in claim 10, further comprising the step of:
    executing the load instruction after the virtual source page address has been translated into a physical source page address.

12. A method as in claim 11, wherein the faulting step is accomplished by trapping to an operating system software routine.

13. An apparatus for processing a load instruction wherein a translation table entry exists for a virtual source page address, comprising:
    a load-type determination circuit for determining whether the load instruction is a non-faulting load instruction or a normal faulting load instruction;
    a test circuit for testing whether a non-fault-only bit in the translation table entry is asserted in response to the load instruction being a normal faulting load instruction;
    a translation circuit for translating the virtual source page address into a physical source page address if the test circuit determines that the non-fault-only bit is not asserted; and a fault unit for faulting if the test circuit determines that the non-fault-only bit is asserted.

14. An apparatus as in claim 13, further comprising:

an execution unit for executing the load instruction after the translation circuit has translated the virtual source page address into a physical source page address if the test circuit determines that the non-fault-only bit is not asserted.

15. An apparatus as in claim 14, wherein the faulting unit causes a trap to an operating system software routine.

16. An apparatus for processing a load instruction wherein a translation table entry exists for a virtual source page address, comprising:

a first test circuit for testing whether the load instruction is a non-faulting load instruction;

a translation circuit for translating the virtual source page address into a physical source page address if the load instruction is a non-faulting load instruction or if the non-fault-only bit is not asserted and the load instruction is not a non-faulting load instruction;

a second test circuit for testing whether a non-fault-only bit in the translation table entry is asserted if the load instruction is not a non-faulting load instruction; and a fault unit for faulting if the non-fault-only bit is asserted and if the load instruction is not a non-faulting load instruction.

17. An apparatus as in claim 16, further comprising:

an execution unit for executing the load instruction after the virtual source page address has been translated into a physical source page address.

18. An apparatus as in claim 17, wherein the fault unit causes a trap to an operating system software routine.

19. A method of maintaining a translation table during processing of a load instruction, comprising the steps of:

testing whether a virtual address requested by the load instruction is illegal;

testing whether the load instruction is a non-faulting load; and creating a translation table entry for the virtual address having an asserted non-fault-only bit if the virtual address is illegal and if the load instruction is a non-faulting load.

20. A method as in claim 19, wherein the translation table entry is created such that the virtual address is mapped to a physical address which contains zero.

21. A method as in claim 20, further comprising the step of:

filling a translation lookaside buffer with the translation table entry.

22. A method as in claim 19, wherein the translation table entry applies to a page of virtual addresses.

* * * * *